(12) United States Patent
Venkitaraman et al.

(10) Patent No.: US 7,824,514 B2
(45) Date of Patent: Nov. 2, 2010

(54) METHOD OF PRODUCING A STRETCH LAMINATE

(75) Inventors: Anand Rudra Venkitaraman, Cincinnati, OH (US); George Stephen Reising, Batavia, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 912 days.

(21) Appl. No.: 11/291,188

(22) Filed: Dec. 1, 2005

(65) Prior Publication Data

US 2007/0125492 A1    Jun. 7, 2007

(51) Int. Cl.
*B32B 37/00* (2006.01)

(52) U.S. Cl. .................... 156/229; 156/308.4; 156/555; 156/582; 156/291; 492/28

(58) Field of Classification Search ............ 156/229, 156/164, 291, 582, 308.4, 555; 492/28
See application file for complete search history.

(56) References Cited

U.S. PATENT DOCUMENTS

| | | | |
|---|---|---|---|
| 4,525,407 A * | 6/1985 | Ness | ........................ 428/138 |
| 4,940,464 A | 7/1990 | Van Gompel et al. | |
| 5,092,861 A | 3/1992 | Nomura et al. | |
| 5,143,679 A | 9/1992 | Weber et al. | |
| 5,156,793 A | 10/1992 | Buell et al. | |
| 5,167,897 A | 12/1992 | Weber et al. | |
| 5,246,433 A | 9/1993 | Hasse et al. | |
| 5,518,801 A | 5/1996 | Chappell et al. | |
| 5,569,234 A | 10/1996 | Buell et al. | |
| 5,592,690 A | 1/1997 | Wu | |
| 5,695,868 A | 12/1997 | Mccormack | |

(Continued)

FOREIGN PATENT DOCUMENTS

EP    588367 B1    4/1997

(Continued)

OTHER PUBLICATIONS

U.S. Appl. No. 11/128,579, filed May 13, 2005, Venkitaraman et al.

(Continued)

*Primary Examiner*—Richard Crispino
*Assistant Examiner*—Christopher Schatz
(74) *Attorney, Agent, or Firm*—George H. Leal; Laura L. Whitmer; William E. Gallagher

(57) ABSTRACT

A method of producing a stretch laminate exhibiting reduced defects from a mechanical activation process can include providing a nipping member. The nipping member can have a first nip region and a non-nip region adjacent to the first nip region. A first substrate and an elastic element are provided to the nipping member. The first substrate and the elastic element are joined in a face to face relationship with adhesive therebetween, thereby creating an intermediate laminate. The intermediate laminate has a first tack down region and an activation region adjacent the first tack down region. A portion of the first tack down region passes through the first nip region, and a portion of the activation region passes through the non-nip region of the nipping member. The activation region of the intermediate laminate is mechanically activated, thereby creating the stretch laminate.

6 Claims, 5 Drawing Sheets

U.S. PATENT DOCUMENTS

| | | | |
|---|---|---|---|
| 5,700,255 A | 12/1997 | Curro et al. | |
| 5,713,884 A | 2/1998 | Osborn, III et al. | |
| 5,789,065 A | 8/1998 | Haffner et al. | |
| 5,837,352 A | 11/1998 | English et al. | |
| 5,897,545 A | 4/1999 | Kline et al. | |
| 5,957,908 A | 9/1999 | Kline et al. | |
| 6,120,487 A | 9/2000 | Ashton | |
| 6,120,489 A | 9/2000 | Johnson et al. | |
| 6,346,162 B1 * | 2/2002 | Reynolds et al. | 156/164 |
| 6,475,591 B2 | 11/2002 | Mushaben | |
| 6,846,134 B1 | 1/2005 | Galletti | |
| 2002/0153086 A1 * | 10/2002 | Alper et al. | 156/161 |
| 2003/0173015 A1 * | 9/2003 | Hamulski et al. | 156/73.1 |
| 2003/0233082 A1 | 12/2003 | Kline et al. | |
| 2006/0137810 A1 * | 6/2006 | Beck et al. | 156/229 |

FOREIGN PATENT DOCUMENTS

| | | |
|---|---|---|
| WO | WO 96/01094 A1 | 1/1996 |
| WO | WO 96/04874 A1 | 2/1996 |
| WO | WO 98/04224 A1 | 2/1998 |
| WO | WO 01/88245 A2 | 11/2001 |

OTHER PUBLICATIONS

International Search Report, Nov. 27, 2001.

* cited by examiner

METHOD OF PRODUCING A STRETCH LAMINATE

FIELD OF THE INVENTION

The present invention pertains to a method of creating and mechanically activating a laminated structure such that the laminated structure exhibits reduced defects from mechanical activation.

BACKGROUND OF THE INVENTION

Stretch laminates are often used in disposable absorbent articles. For example, stretch laminates can be utilized in leg regions and waist regions of a disposable absorbent diaper, thereby allowing the disposable absorbent diaper to extend and contract about the leg regions and the waist region. The capability to extend and contract about the leg regions and the waist can provide improved fit for the disposable absorbent diaper with a wide range of wearers.

Conventional stretch laminates typically comprise a pair of nonwovens and an elastic film sandwiched in between the pair of nonwovens. Generally, the two nonwoven materials are attached to the elastic film via an adhesive.

Convention stretch laminates typically comprise multiple regions of adhesive application. For example, some conventional stretch laminates may comprise a pair of tack down regions disposed adjacent to the ends of the laminate. Additionally, some conventional stretch laminates will further comprise an activation region disposed between the tack down regions.

In general conventional stretch laminates are subjected to a nipping process and then to a mechanical activation process. The nipping process typically compresses the pair of nonwovens and the elastic film together causing the adhesive to penetrate into the interstices of the nonwovens.

Downstream of the nipping process, the mechanical activation process generally involves meshing the conventional stretch laminate between sets of teeth. Typically, during the mechanical activation process, the activation region of the stretch laminate is meshed between the teeth while the tack down regions are generally not significantly meshed between the teeth. Because conventional stretch laminates are intermeshed between the teeth of the activation rolls, the nonwoven materials are permanently elongated at least to a certain degree, so that upon release of the applied tensile forces, the stretch laminate generally will not fully return to its original undistorted configuration.

The mechanical activation process is often performed at high speeds which may cause the stretch laminate to experience high strain rates during the mechanical activation process. Moreover, in order to provide the stretch laminate with greater extensibility, the stretch laminate may be exposed to high percentages of strain which can also lead to higher strain rates during mechanical activation. Unfortunately, higher strain rates are typically associated with higher defect levels.

Many stretch laminates can incur defects from the mechanical activation process, in part, because of the high strain rates experienced during the mechanical activation process. Many of the defects are structural in nature. For example, an elastic film which undergoes the mechanical activation process may experience defects such as holes which may reduce the structural integrity of the elastic film.

Consequently, a method is needed for producing a stretch laminate which exhibits reduced defects from a mechanical activation process.

SUMMARY OF THE INVENTION

A method of the present invention can produce a stretch laminate which exhibits reduced defects from a mechanical activation process. In one embodiment of the present invention, a method of making a stretch laminate which exhibits reduced defects from a mechanical activation process provides a nipping member. The nipping member comprises a first nip region and a non-nip region disposed adjacent to the first nip region. A first substrate web and an elastic element are provided to the nipping member. The first substrate web and the elastic element are joined in a face to face relationship with adhesive therebetween, thereby creating an intermediate laminate.

The intermediate laminate comprises a first tack down region and an activation region disposed adjacent to the first tack down region. A portion of the first tack down region is passed through the first nip region, and a portion of the activation region is passed through the non-nip region of the nipping member. The activation region of the intermediate laminate is mechanically activated, thereby creating the stretch laminate.

In another embodiment, a method of making a stretch laminate which exhibits reduced defects from a mechanical activation process includes the step of providing a mechanical activation member. A first substrate web and an elastic element are provided to the mechanical activation member. Adhesive is applied to the first substrate web. The first substrate web and the elastic element are mechanically activated in a face to face relationship with adhesive therebetween. The first substrate web and the elastic element are then nipped in a nipping member, thereby forming the stretch laminate.

DETAILED DESCRIPTION OF THE INVENTION

Figure 1:
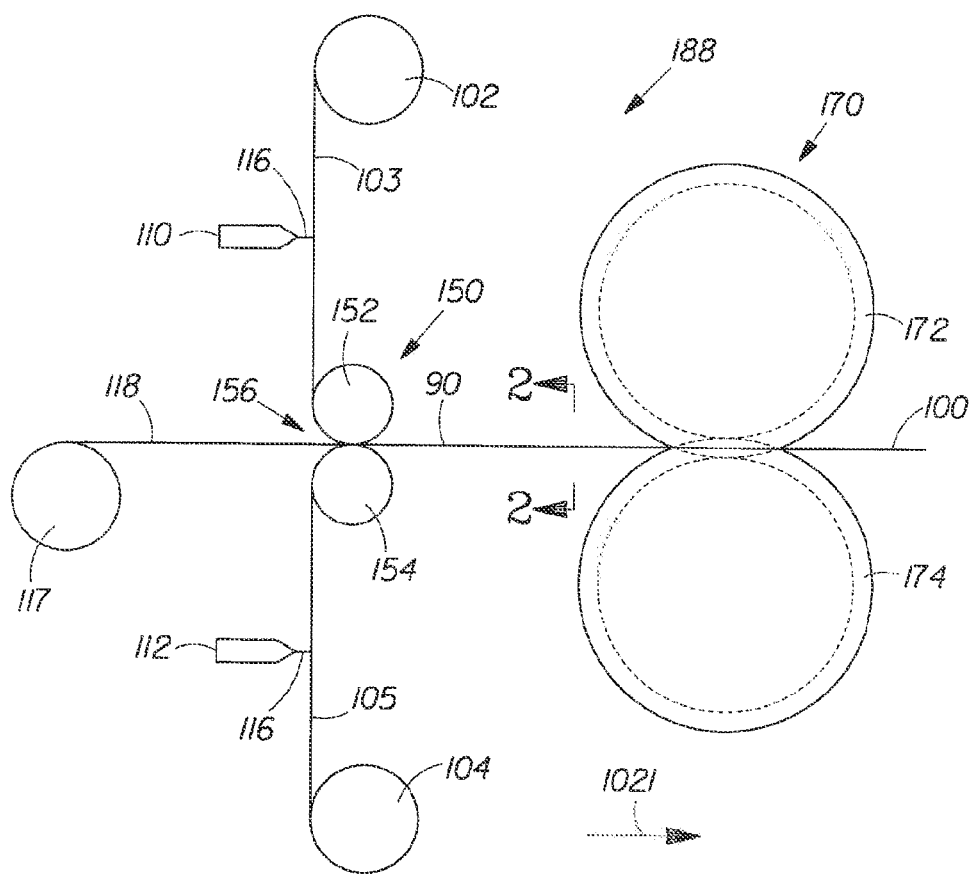
FIG. 1 is a schematic view showing one embodiment of the present invention.

Definitions:

The following terminology is used herein consistent with the plain meaning of the terms with further details provided in the present specification.

As used herein, the terms "absorbent article" and "article" refer to a wearable device that absorbs and/or contains liquid and, more specifically, refers to a device that is placed against or in proximity to the body of a wearer to absorb and contain various exudates discharged from the body. Suitable examples include diapers, training pants, refastenable pants, pull-on garments, adult incontinence products, and feminine care products such as sanitary napkins. Furthermore, the terms "absorbent article" and "article" include "disposable absorbent articles" which are intended to be discarded and not laundered or otherwise restored generally after a single use (although certain components may be recycled, reused, or composted).

The terms "activating", "activation", or "mechanical activation", refer to the process of making a substrate, or an elastomeric laminate more extensible than it was prior to the process.

The term "attached" refers to elements being connected or united by fastening, adhering, bonding, etc. by any method suitable for the elements being fastened, secured, or joined, together and their constituent materials. Many suitable methods for attaching elements together are well-known, examples include adhesive bonding, pressure bonding, thermal bonding, mechanical fastening, etc. Such attachment methods may be used to attach elements together over a particular area either continuously or intermittently. The term "attached" includes elements which are integrally formed from another element.

"Basis weight" refers to the weight of a planar material for a given surface area. Basis weight is typically measured in grams per square meter (gsm). The basis weight of an elastomeric laminate is typically measured in an unstrained configuration.

As used herein, the term "diaper" refers to an absorbent article generally worn by infants and incontinent persons about the lower torso so as to encircle the waist and legs of the wearer and that is specifically adapted to receive and contain urinary and fecal waste. As used herein, term "diaper" also includes "pants" which are defined below.

As used herein "elastically extensible" refers to the characteristic of an extensible material that has the ability to return to approximately their original dimensions after a force that extended the extensible material is removed. Herein, any material or element described as "extensible" may also be "elastically extensible", unless otherwise provided.

The term "longitudinal" is used herein to refer to a direction which is generally parallel to the longest edge of an element except where otherwise noted. In the context of some disposable absorbent articles, a "longitudinal" direction runs substantially perpendicular from a waist edge to an opposing waist edge of the article and generally parallel to the maximum linear dimension of the article. Directions within ±45 degrees of the longitudinal direction are considered to be "longitudinal".

The term "lateral" refers to a direction running generally perpendicular to and in the same plane as the "longitudinal" direction. In the context of some disposable absorbent articles, a "lateral" direction runs from one longitudinal edge of the article to an opposing longitudinal edge of the article. Directions within ±45 degrees of the lateral direction are considered to be "lateral".

The terms "pant", "training pant", "closed diaper", "prefastened diaper", and "pull-on diaper", as used herein, refer to disposable garments having a waist opening and leg openings designed for infant or adult wearers. A pant can be configured such that the pant has a closed waist and leg openings prior to being donned on the wearer, or the pant can be configured such that the waist is closed and the leg openings formed while on the wearer. A pant may be preformed by any suitable technique including, but not limited to, joining together portions of the article using refastenable and/or non-refastenable bonds (e.g., seam, weld, adhesive, cohesive bond, fastener, etc.). A pant may be preformed anywhere along the circumference of the article (e.g., side fastened, front waist fastened, rear waist fastened). Examples of suitable pants are disclosed in U.S. Pat. No. 5,246,433; U.S. Pat. No. 5,569,234; U.S. Pat. No. 6,120,487; U.S. Pat. No. 6,120,489; U.S. Pat. No. 4,940,464; U.S. Pat. No. 5,092,861; U.S. Pat. No. 5,897,545; U.S. Pat. No. 5,957,908; and U.S. Patent Publication No. 2003/0233082 A1.

The term "stretch laminate" refers to a laminated structure which is elastically extensible.

The terms "fibrous substrate" and "substrate" refer to a web material which is made up a plurality of fibers. The fibers can be intermeshed with one another in random or uniform patterns. Some examples of substrates are wovens, nonwovens, or a combination thereof.

The term "nonwoven" refers herein to a substrate made from continuous (long) filaments (fibers) and/or discontinuous (short) filaments (fibers) by processes such as spunbonding, meltblowing, carded, and the like. Nonwovens do not have a woven or knitted filament pattern.

Description:

The method of the present invention may provide a stretch laminate which exhibits a reduced number of defects from a mechanical activation process. The method of the present invention may provide a stretch laminate which exhibits a reduced number of defects when subjected to a high strain rate over other methods. Strain rates are discussed hereafter in regard to Table I and Table II.

The stretch laminate of the present invention may be incorporated into any suitable part or suitable element of an absorbent article. For example, the stretch laminate of the present invention may be incorporated in an ear panel which is attached to the absorbent article. In yet another example, the stretch laminate of the present invention may also be included in a waist region or leg region of a pant. The stretch laminate of the present invention can be incorporated into an absorbent article such as a diaper or a pant in any location or region where it would be desirable to incorporate the properties of a stretch laminate.

FIG. 1, shows an example of one embodiment of a process 188 for creating a stretch laminate 100 in accordance with the present invention. As shown, the stretch laminate 100 may comprise a first substrate web 103 supplied by a first substrate supply 102 and an elastic element 118 supplied by an elastic supply 117. In some embodiments, an adhesive 116 can be applied to the first substrate web 103 by a first adhesive source 110. In addition, as shown, in some embodiments, the stretch laminate 100 may further comprise a second substrate web 105 which is supplied by a second substrate supply 104. Similar to the first substrate 103, in some embodiments, the adhesive 116 can be applied to the second substrate web 105 by a second adhesive source 112. In other embodiments, the adhesive 116 may be applied to the elastic element 118.

As shown, in some embodiments, the first substrate web 103, the second substrate web 105, and the elastic element 118, can be supplied to a nipping member 150. The nipping member 150 may comprise a first nip roll 152 and a second nip roll 154 which form a nip 156 in between the first nip roll 152 and the second nip roll 154. As the first substrate web 103, the elastic element 118, and the second substrate web 105, pass through the nip 156 of the nipping member 150, the first nip roll 152 and the second nip roll 154 selectively nip the first substrate web 103, the elastic element 118, and the second substrate web 105, thereby forming an intermediate laminate 90.

It has been discovered that by selectively nipping the first substrate web 103, the second substrate web 105, and the elastic element 118, the number of defects which the intermediate laminate 90 incurs from the mechanical activation process can be impacted. In some embodiments, selective nipping can involve compressing some regions of the first substrate web 103, the elastic element 118, and the second substrate web 105, together while not compressing other regions. In other embodiments, selective nipping can involve compressing some regions of the first substrate web 103, the elastic element 118, and the second substrate web 105, to a greater extent than other regions. Some embodiments of selective nipping are discussed hereafter with regard to FIGS. 3A and 3B.

Downstream (direction 1021) of the nipping member 150, in some embodiments, the intermediate laminate 90 can be mechanically activated by a mechanical activation member 170, thereby producing the stretch laminate 100. The intermediate laminate 90 is a stretch laminate which has not been mechanically activated.

The mechanical activation member 170 may comprise a first activation roll 172 and a second activation roll 174. Each of the first activation roll 172 and the second activation roll 174 may comprise a plurality of teeth. The teeth of the first activation roll 172 and the teeth of the second activation roll 174 can intermesh with each other.

Figure 2:
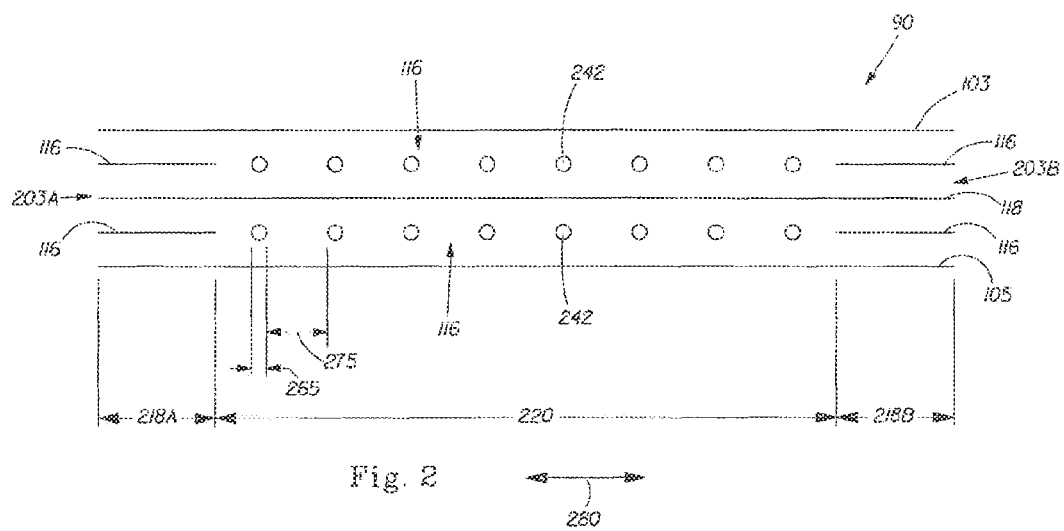
FIG. 2 is a cross sectional view through line 2-2 showing the stretch laminate of FIG. 1 before the mechanical activation process.

As shown in FIG. 2, the intermediate laminate 90 may comprise a plurality of adhesive regions disposed between the first substrate 103 and the elastic element 118. Similarly, in some embodiments, a plurality of adhesive regions may exist between the second substrate 105 and the elastic element 118. For ease of explanation, reference shall only be made to the adhesive regions which may exist between the first substrate web 103 and the elastic element 118.

As shown, in some embodiments, the intermediate laminate 90 may comprise a first tack down region 218A disposed adjacent to a first end 203A of the intermediate laminate 90 in between the first substrate web 103 and the elastic element 118. An activation region 220 can disposed adjacent to the first tack down region 218A between the first substrate web 103 and the elastic element 118. In some embodiments, the intermediate laminate 90 may further comprise a second tack down region 218B disposed adjacent to a second end 203B of the intermediate laminate 90 in between the first substrate web 103 and the elastic element 118. In other embodiments, the activation region 220 can be disposed between the first tack down region 218A and the second tack down region 218B.

In some embodiments, the adhesive 116 can be applied to the intermediate laminate 90 in the tack down regions 218A and 218B in strips. For example, the adhesive 116 applied in the tack down regions 218A and 218B between the first substrate web 103 and the elastic element 118 can have a width W in a lateral direction 280 which ranges from about 1 mm to about 10 mm from the ends 203A and 203B of the intermediate laminate 90 extending inward or any suitable number within that range. The adhesive 116 applied between the second substrate web 105 and the elastic element 118 in the first tack down region 218A and the second tack down region 218B can be similarly configured.

The adhesive 116 in the activation region 220 between the first substrate web 103 and the elastic element 118 can be applied as a plurality of adhesive stripes 242. Each of the plurality of adhesive stripes 242 can have a width 265, and adjacent adhesive stripes 242 can be spaced apart by a distance 275 in a lateral direction 280. In some embodiments, the width 265 of the adhesive stripes 242 can be less than or equal to about 1 mm while the distance 275 between the adhesive stripes 242 can be greater than 1 mm. For example, the adhesive stripes 242 applied to the activation region 220 can have a width 265 of about 1 mm while the distance 275 between adjacent stripes is greater than or equal to about 1.5 mm. In other embodiments, the adhesive stripes applied to the activation region 220 can have a width 265 of about 1 mm while the distance 275 between adjacent stripes is greater than or equal to about 2 mm. In yet other embodiments, the adhesive stripes 242 applied to the activation region 220 can have a width 265 of about 1 mm while the distance 275 between the stripes is greater than or equal to about 2.5 mm. In yet other embodiments, the adhesive stripes 242 applied to the activation region 220 can have a width 265 of about 1 mm while the distance 275 between the stripes is less than about 3 mm. Embodiments are contemplated where the adhesive stripes 242 have varying widths 265 and vary in distance 275 in between adjacent adhesive stripes 242. The adhesive 116 applied between the second substrate web 105 and the elastic element 118 in the activation region 220 can be similarly configured.

The adhesive stripes 242 may comprise any suitable width 265 and the distance 275 between adjacent stripes can be any suitable distance to assist in achieving reduced defects. For example, adhesive stripes 242 can have widths 265 which range from about 0.5 mm to about 1 mm or any individual number within the range. In another example, the adhesive stripes 242 have a width 265 which is about 0.8 mm.

As discussed previously, in conventional stretch laminate formation processes, the entirety of the tack down regions along with the activation regions are generally subjected to the nipping operation. Without wishing to be bound by theory, it is believed that in conventional stretch laminates when the activation region is subjected to a conventional nipping process, a significant amount of adhesive can penetrate into the nonwovens of the conventional stretch laminate. It is believed that the penetration of adhesive can overly restrict the movement of the nonwovens with respect to the elastic film during the mechanical activation process. It is believed that this restriction by the adhesive can lead to increased localized strains in many of the fibers of the nonwovens during the mechanical activation process. It is further believed that the increased localized strain can lead to fracture of many of the fibers, thereby causing premature failure of the nonwovens during the mechanical activation process.

In contrast, it has been discovered that via selective nipping of the first substrate web 103, the second substrate web 105, and the elastic element 118, the number of defects which the intermediate laminate 90 incurs from the mechanical activation process can be impacted. For example, in some embodiments, the nipping member 150 (shown in FIG. 1) of the present invention can selectively nip the first substrate web 103, the elastic element 118, and the second substrate web 105, at the first tack down region 218A and/or the second tack down region 218B while applying no nipping pressure to the activation region 220. In other embodiments, the nipping member 150 (shown in FIG. 1) can selectively nip at the first tack down region 218A and/or the second tack down region 218B while applying a reduced nipping pressure to the activation region 220.

In applying no nipping pressure or reduced nipping pressure to the activation region 220, it is believed that the adhesive 116 does not substantially penetrate into the first substrate web 103 and/or the second substrate web 105 in the activation region 220. Thus, it is believed that the movement of the first substrate web 103 and/or the second substrate web 105 with respect to the elastic element 118 during mechanical activation is not limited to the extent that movement is in a conventional process. Consequently, it is believed that localized strains are decreased, thereby reducing the number of defects the stretch laminate 100 (shown in FIG. 1) will exhibit as a result of the mechanical activation process. Exemplary means of applying no nipping pressure or reduced nipping pressure to the activation region 220 are discussed in regard to FIGS. 3A-3C.

Figure 3A:
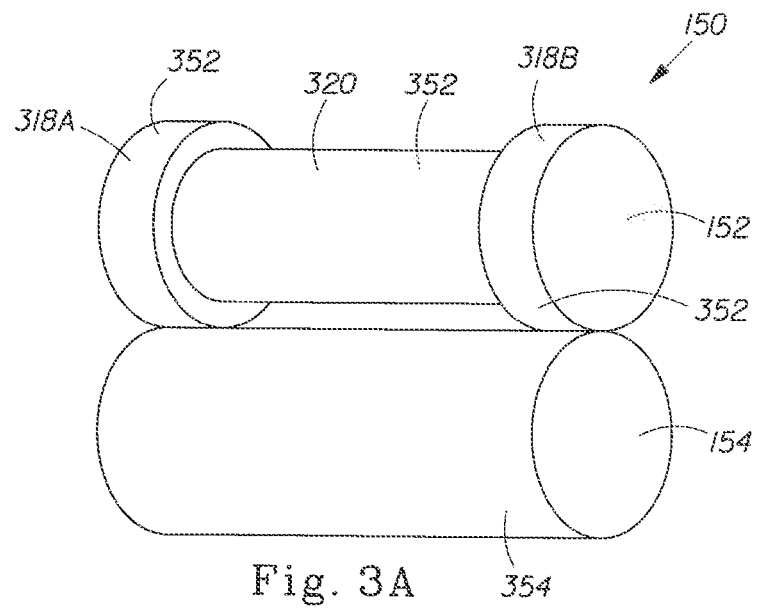
FIG. 3A is an isometric view showing a nipping member of the process of FIG. 1.

As shown in FIG. 3A, in some embodiments, the first nip roll 152 may comprise a plurality of regions which generally correspond to the first tack down region 218A, the second tack down region 218B, and the activation region 220, of the intermediate laminate 90 (shown in FIG. 2). For example, in some embodiments, an outer surface 352 of the first nip roll 152 may comprise a first nip region 318A, a second nip region 318B, and a non-nip region 320. The first nip region 318A can be disposed adjacent an end of first nip roil 152 while the second nip region 31813 can be disposed adjacent to another end of the first nip roll 152. The non-nip region 320 can be disposed adjacent to the first nip region 318A and between the first nip region 318A and the second nip region 318B. Embodiments are contemplated where the first nip roll 152 comprises one or more nip regions and/or one or more non-nip regions.

In some embodiments, the first nip region 318A may correspond with the first tack down region 218A of the intermediate laminate 90. For example, when the first substrate web 103 (shown in FIGS. 1 and 2), the second substrate web 105 (shown in FIGS. 1 and 2), and the elastic element 118 (shown in FIGS. 1 and 2) pass through the nip 156 (shown in FIGS. 1 and 2), the first nip region 318A can compress the first substrate web 103 (shown in FIG. 1), the second substrate web 105 (shown in FIG. 1), and the elastic element 118 (shown in FIG. 1), thereby forming the first tack down region 218A (shown in FIG. 2) of the intermediate laminate 90 (shown in FIGS. 1 and 2). The second nip region 318B can be configured similar to the first nip region 318A such that the second tack down region 218B can be formed thereby.

The non-nip region 320 may correspond with the activation region 220 (shown in FIG. 2) of the intermediate laminate 90 (shown in FIGS. 1 and 2). For example, in some embodiments, when the first substrate web 103 (shown in FIGS. 1 and 2), the second substrate web 105 (shown in FIGS. 1 and 2), and the elastic element 118 (shown in FIGS. 1 and 2), pass through the nip 156 (shown in FIG. 1), the non-nip region 320 applies no nipping pressure to the activation region 220. In other embodiments, the non-nip region 320 may apply a lower nipping pressure to the activation region 220 (shown in FIG. 2) than a pressure applied by the first nip region 318A.

There are several means by which the non-nip region 320 can apply no pressure to the first substrate web 103 (shown in FIGS. 1 and 2), the second substrate web 105 (shown in FIGS. 1 and 2), and the elastic element 118 (shown in FIGS. 1 and 2) in the activation region 220 (shown in FIG. 2). For example, in some embodiments, the outer surface 352 of the first nip roll 152 may have a variable diameter. So, in some embodiments, the first nip roll 152 at the first nip region 318A may have a first diameter, and the first nip roll 152 at the non-nip region 320 may have a second diameter. The first diameter can be greater than the second diameter. As an example, the first diameter can be 10 mm while the second diameter can be 8.5 mm. In yet another example, a ratio of the first diameter to the second diameter can be in a range from about 1 to about 10 or any individual number within the range. In yet another example, the ratio can be from about 1 to about 5. In yet another example, the ratio can be from about 1 to about 2.

In other embodiments, the first nip roll 152 can be made up of varying materials on its outer surface 352. For example, the first nip roll 152 adjacent the first nip region 318A on the outer surface 352 may comprise a material having a first Young's modulus E1, and the first nip roll 152 adjacent the non-nip region 320 on the outer surface 352 may comprise a material having a second Young's modulus E2. The first Young's modulus E1 can be greater than the second Young's modulus E2. For example, adjacent the first nip region 318A, the first nip roll 152 may comprise steel, while adjacent the non-nip region 320, the first nip roll 152 may comprise an elastomeric material.

Figure 3B:
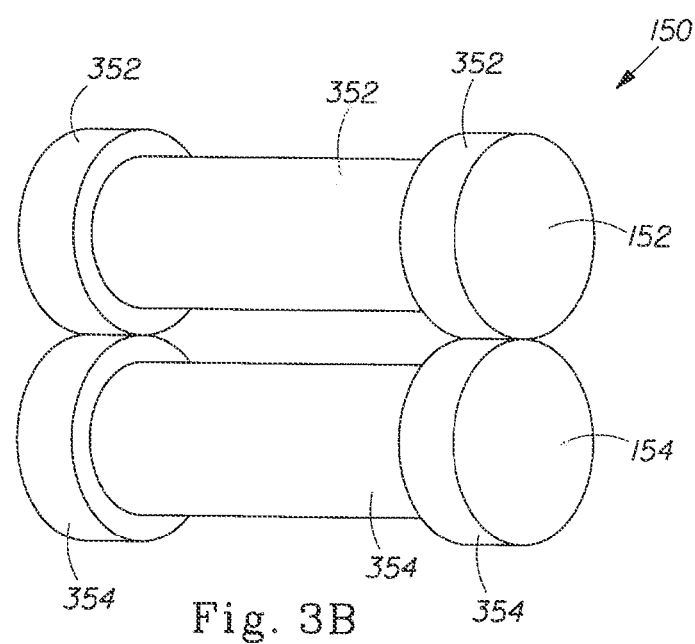
FIGS. 3B and 3C are isometric views showing other embodiments of nipping members which can be utilized in the process of FIG. 1.

As shown, in some embodiments, the second nip roll 154 may comprise an outer surface 354 which has a uniform diameter. In other embodiments, as shown in FIG. 3B, an outer surface 354 of the second nip roll 154 can be configured similar to the first nip roll 152. In other embodiments, the second nip roll 154 may comprise varying materials on its outer surface 354 which have varying Young's moduli.

Figure 3C:
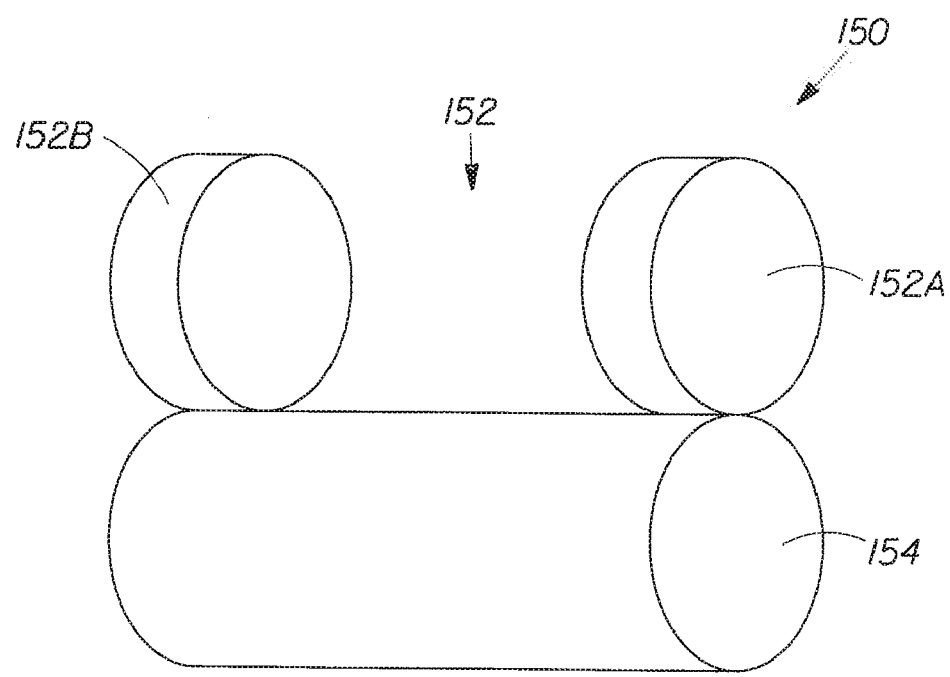

As shown in FIG. 3C, in other embodiments, the first nip roll 152 may comprise a plurality of discrete rolls. In some embodiments, a first discrete roll 152A can correspond to the first tack down region 218A (shown in FIG. 2) of the intermediate laminate 90 (shown in FIGS. 1 and 2). In other embodiments, a second discrete roll 152B can correspond to the second tack down region 218B (shown in FIG. 2) of the intermediate laminate 90 (shown in FIGS. 1 and 2). In some embodiments, the second nip roll 154 can be configured similarly to the first nip roll 152.

In other embodiments, material can be added to the first tack down region 218A (shown in FIG. 2) and/or the second tack down region 218B (shown in FIG. 2) such that a higher pressure is applied to the first tack down region 218A (shown in FIG. 2) and/or the second tack down region 218B (shown in FIG. 2) as opposed to the activation region 220 (shown in FIG. 2). In other embodiments, material can be added to the first tack down region 218A (shown in FIG. 2) and/or the second tack down region 218B such that no pressure is applied to the activation region 220 (shown in FIG. 2).

The means by which no pressure or reduced pressure is applied to the activation region 220 (shown in FIG. 2) by the non-nip region 320 (shown in FIG. 3A) can be any suitable means in the art.

With regard to the nipping pressure applied by the first nip region 318A and/or the second nip region 318B to the first substrate web 103 (shown in FIGS. 1 and 2), the second substrate web 105 (shown in FIGS. 1 and 2), and the elastic element 118 (shown in FIGS. 1 and 2). A Hertzian equation along with a value for an applied force can provide a calculated applied pressure applied to the intermediate laminate 90 as it is passed through the nipping member 150. The pressure applied to by the first nip region 318A and/or the second nip region 318B can be any suitable pressure to join the first substrate web 103, the elastic element 118, and/or the second substrate web 105. Additionally, the pressure applied to the activation region 220 (shown in FIG. 2) can be any suitable pressure to achieve reduced defects.

The first nip region 318A and/or the second nip region 318B can apply a first pressure to the intermediate laminate 90 as it is passed through the nipping member 150. The activation region 320 can apply a second pressure as the intermediate laminate 90 is passed through the nipping member 150. The first pressure is greater than the second pressure. In some embodiments, a ratio of the first pressure to the second pressure can be greater than 1. In some embodiments, where the second pressure is zero, the first pressure can be infinite.

Figure 4:
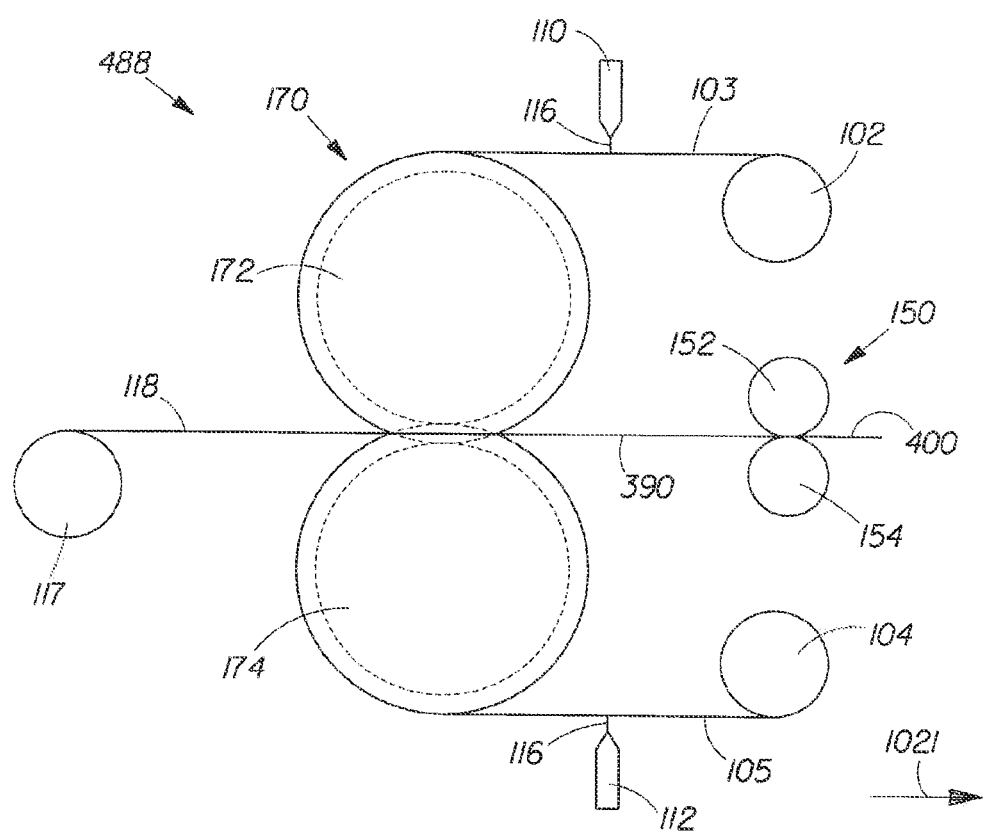
FIG. 4 is a schematic view showing another embodiment of the present invention.

Another process of the present invention for creating a stretch laminate is shown in FIG. 4. In some embodiments, a stretch laminate 400 constructed in accordance with the present invention can be formed via a process 488. In contrast to the process shown in FIG. 1, in the process 488, the first substrate web 103, the elastic element 118, and the second substrate web 105, can be provided to the mechanical activation member 170 prior to being provided to the nipping member 150.

Downstream 1021 of the mechanical activation member 170, an intermediate stretch laminate 390 can be provided to the nipping member 150. The nipping member 150 may comprise the first nip roll 152 and the second nip roll 154. In some embodiments, the outer surface 352 (shown in FIGS. 3A and 3B) of the first nip roll 152 can be uniform without a plurality of regions. The second nip roll 154 can be similarly configured. Alternatively, the first nip roll 152 and the second nip roll 154 can be configured as described in regard to FIGS. 3A-3C.

As stated previously, without wishing to be bound by theory, it is believed that the penetration of adhesive into the interstices of the substrates may restrict the movement of the substrates with respect to the elastic element during mechanical activation, thereby increasing the likelihood of defects during mechanical activation. With regard to this embodiment of the present invention, it is believed that because the first substrate web 103, the second substrate web 105, and the elastic element 118 are mechanically activated prior to passing through the nipping member 150, the adhesive 116 applied to the first substrate web 103 and the second substrate web 105 does not sufficiently penetrate the interstices of the substrate. Consequently, it is believed the movement of the first substrate web 103 and the second substrate web 105 with respect to the elastic element 118 during mechanical activation is not restricted by the adhesive 116 as much as in conventional processes.

Table I illustrates the reduction in the number of defects which were realized via the methods of the present invention discussed heretofore. Several intermediate stretch laminate samples were constructed from two layers of nonwoven—a first layer having a basis weight of 27 gsm and a second layer having a basis weight of 17 gsm. The layers of nonwoven are sold under the model names HEC and SMS, respectively. The nonwovens are manufactured by BBA Fiberweb™, located in Brentwood, Tenn. A film having a basis weight of 67 gsm was sandwiched between the two layers of nonwoven. The film was manufactured by Tredegar and has a model number of X31598. An adhesive was applied to the nonwovens at 14 gsm each. For each nonwoven, the adhesive was applied in a striped pattern in the activation region 220 (shown in FIG. 2) with 1 mm adhesive stripes and 1 mm spacing in between adjacent stripes. In addition, 5 mm strips of adhesive were applied in the first tack down region 218A (shown in FIG. 2) and the second tack down region 218B (shown in FIG. 2). The adhesive was manufactured by Bostik located in Wauwatosa, Wisconsin, and has a model number of H2861.

Each of the intermediate stretch laminate samples was subjected to a mechanical activation process. In each mechanical activation process, the first activation roll 172 (shown in FIGS. 1 and 4) had 9 teeth having a tooth pitch of 3.81 mm, and the second activation roll 174 (shown in FIGS. 1 and 4) had 8 teeth having a tooth pitch of 3.81 mm.

Some intermediate stretch laminate samples were exposed to a conventional stretch laminate process, some intermediate stretch laminate samples were exposed to the selective nipping process in accordance with the present invention, and some intermediate stretch laminate samples were exposed to the process 488 (shown in FIG. 4). Specifically, nine samples were exposed to conventional processing, nine samples were exposed to the process 188 described in FIG. 1 including the nipping member of FIG. 3A, and nine samples were exposed to the process 488 (shown in FIG. 4). Data for the stretch laminates which were produced via conventional processing are listed under the column heading "Conventional process". Data for the stretch laminates which were produced via the process 188 of FIG. 1 including the nipping member as described in regard to FIG. 3A are listed under the column heading "Selective Nip". Data for the stretch laminates which were produced via the process 488 (shown in FIG. 4) are listed under the column heading "Reverse Order". The number of defects is shown in Table I along with the strain rates for each of samples tested.

TABLE I

| Web speed m/min | Strain Rate s⁻¹ | Defects (holes/5 m) | | |
|---|---|---|---|---|
| | | Conventional process | Selective Nip | Reverse Order |
| 200 | 598 | 13.3 | 0 | 0.3 |
| 200 | 678 | 55.3 | 0 | 0.7 |
| 200 | 756 | 188.7 | 0.3 | 0.3 |
| 250 | 756 | 5 | 0 | 0.3 |
| 250 | 856 | 41 | 0.3 | 0 |
| 250 | 958 | 90.3 | 1 | 0.3 |
| 300 | 907 | 8.7 | 0 | 0 |
| 300 | 1028 | 34.3 | 0 | 0 |
| 300 | 1146 | 94 | 0.3 | 0.7 |

As is shown, at a web speed of 200 m/min a stretch laminate constructed via a process of the present invention exhibited, in some instances, a 100% reduction in defects. Similarly, at a web speeds of 250 m/min and at 300 m/min, a stretch laminate constructed via processes of the present invention exhibited in some instances a 100% reduction in the number of defects.

Also, as shown in Table I, the processes of the present invention can yield stretch laminates which exhibit reduced defects at strain rates in excess of 500 s⁻¹. Based on the data, it is believed that, in some embodiments, the processes of the present invention can also yield stretch laminates which exhibit reduced defects at strain rates which are greater than about 100 s⁻¹, greater than about 200 s⁻¹, greater than about 300 s⁻¹, or greater than about 400 s⁻¹.

Base on further experiments, it is believed that the temperature of the first substrate web 103, the second substrate web 105, and the elastic element 118, during mechanical activation can impact the number of defects exhibited by a stretch laminate. Table II provides data which shows the number of defects exhibited by stretch laminates produced via the conventional stretch laminate process and defects exhibited by stretch laminates produced via the process 488.

The temperatures of the first substrate web 103, the second substrate web 105, and the elastic element 118, were approximated utilizing modeling software FEMLAB™ manufactured by Comsol, Inc. in Stockholm, Sweden, for both processes. The stretch laminate samples subjected to the conventional mechanical activation process were mechanically activated at temperatures in a range from about 35° C. to about 45° C. In contrast, in the stretch laminate samples which were mechanically activated via the process 488 (shown in FIG. 4), the first substrate web 103 and the second substrate web 105 were mechanically activated at a temperature in a range from about 60° C. to about 70° C. while the elastic element 118 was mechanically activated at a temperature in a range from about 22° C. to about 25° C.

Regarding Table II, several stretch laminate samples were constructed from two layers of nonwoven—each layer of nonwoven having a basis weight of 17 gsm. The layers of nonwoven are sold under the model name SMS and are manufactured by BBA Fiberweb™, located in Brentwood, Tenn. An elastic film was sandwiched between the two layers of nonwoven. The elastic element was a film manufactured by Tredegar and has a model number of CEX 826. An adhesive was applied to the nonwovens at 14 gsm each. For each nonwoven, the adhesive was applied in a striped pattern in the activation region 220 (shown in FIG. 2) with 1 mm adhesive stripes and 1 mm spacing in between adjacent stripes. In addition, 5 mm strips of adhesive were applied in the first tack down region 218A (shown in FIG. 2) and the second tack down region 218B (shown in FIG. 2 The adhesive was manufactured by Bostik located in Wanwatosa, Wis., and has a model number of H2861.

Each of the stretch laminate samples was subjected to a mechanical activation process. In each mechanical activation process, the first activation roll 172 (shown in FIGS. 1 and 4) had nine teeth having a tooth pitch of 3.81 mm, and the second activation roll 174 (shown in FIGS. 1 and 4) had eight teeth having a tooth pitch of 3.81 mm.

Some stretch laminate samples were created via a conventional stretch laminate process, some stretch laminate samples were created via the process 488 (shown in FIG. 4). Specifically, six stretch laminate samples were exposed to conventional processing and six stretch laminate samples were exposed to the process 488 (shown in FIG. 4). Data for the stretch laminate samples which were produced via the process 488 (shown in FIG. 4) are listed under the column heading "Reverse Order—Temperature". The number of defects is shown in Table II along with the strain rates for each of samples tested.

TABLE II

| Web speed m/min | Strain Rate s$^{-1}$ | Defects (holes/5 m) | |
|---|---|---|---|
| | | Conventional process | Reverse Order Temperature |
| 200 | 598 | 3.3 | 0 |
| 200 | 678 | 14.7 | 0 |
| 200 | 756 | shred | 0 |
| 300 | 907 | shred | 0 |
| 300 | 1028 | shred | 0 |
| 300 | 1146 | shred | 0 |

As shown, the stretch laminate samples created via the process 488 of the present invention showed a 100% reduction in the number of defects over all of the stretch laminate samples produced via the conventional process. The term "shred" is used to describe a complete breakdown or near complete breakdown of the entire stretch laminate.

Based on the data in Table II, it is believed that increased temperatures of the first substrate web 103 and the second substrate web 105 and decreased temperature of the elastic element 118, during mechanical activation can reduce the number of defects which a stretch laminate exhibits. It is further believed that similar results can be achieved on the process 188 (shown in FIG. 1). For example, heating elements could be positioned adjacent the first substrate web and/or the second substrate web to increase the temperature of the first substrate web and/or the second substrate web. In addition to or alternatively, a cooling element can be positioned adjacent the elastic element such that the temperature of the elastic element entering the nipping member is reduced below room temperature.

The stretch laminate of the present invention can be created from a variety of materials. For example, the first substrate web 103 (shown in FIGS. 1 and 2) and the second substrate web 105 (shown in FIGS. 1 and 2) may comprise a nonwoven web. Any suitable nonwoven can be used. For example, a suitable nonwoven for use in the present invention can comprise fibers made of polypropylene, polyethylene, polyolefins, polyester, nylon, cellulose, polyamide, bicomponent fibers, or any combination thereof. The bases weight of the nonwoven can be any suitable basis weight. For example, in some embodiments, the basis weight will typically be in a range from about 8 gsm to about 40 gsm.

Any process known in the art may be used to make the nonwovens. Exemplary processes include spunbond, spunbond meltblown spunbond (SMS), spunbond meltblown meltblown spunbond (SMMS), carded and the like. Particularly acceptable nonwovens include high elongation carded (HEC) nonwovens and deep activation polypropylene (DAPP) nonwovens.

The fibers of the nonwovens may be bonded internally, and include fibers that are needle punched, hydro entangled, spun bonded, thermally bonded, bonded by various types of chemical bonding such as latex bonding, powder bonding, and the like.

Any suitable adhesive 116 can be used in the present invention. For example, the adhesive 116 (shown in FIGS. 1 and 2) of the present invention may comprise styrene-olefin-styrene triblock copolymers such as styrene-isoprene-styrene, styrene-butadiene-styrene, or combinations thereof. The basis weight of the adhesive, in some embodiments, can be in a range from about 4 gsm to about 28 gsm or any individual number within that range. The basis weight of the adhesive 116 (shown in FIGS. 1 and 2) is measured as the total amount of adhesive over the areas of the surfaces which the adhesive covers instead of calculated over the entire surface area of the substrate to which the adhesive is applied.

The adhesive 116 can be applied in any suitable manner. Suitable adhesive applicators 110 and 112 are commercially available under the model numbers EP11, EP45, EP51, and manufactured by Nordson Corporation located in Westlake, Ohio, U.S.A.

Any suitable elastic element 118 can be used in the present invention. For example, the elastic elements of the present invention may comprise films comprising polypropylene, polyethylene, polyolefins, styrene-isoprene-styrene, styrene-butadiene-styrene, or combinations thereof. The basis weight of the films can be any suitable basis weight. In some embodiments, the basis weight will be in a range from about 10 gsm to about 100 gsm or any individual number within the range.

Any suitable form of elastic element 118 can be used in the present invention. For example, the elastic element 118 may comprise a plurality of discrete elastic film panels. As another example the elastic element 118 may include a plurality of elastomeric strands. In yet another example, the elastic element 118 may comprise a portion of a web of elastic film. The elastomeric strands can be pre-made and unwound from a supply roll during processing. Alternatively, the elastomeric strands can be extruded onto the first substrate and/or the second substrate.

Test Methods:

Calculating Strain and Strain Rate:

Equations for calculating the strain experienced by a laminated structure are discussed in U.S. Pat. No. 6,846,134. The average strain rate (t) is determined by taking the first derivative of strain(t). The first derivative of strain(t) can be derived using, for example, a commercially available math processing software package such as Mathcad™ version 11.0 manufactured by Mathsoft Inc. located in Cambridge Mass.

Determining the Number Defects in a Stretch Laminate:

A defect on a laminated structure caused by the mechanical activation process may include a "hole". In general, the majority of defects which occur on stretch laminates because of the mechanical activation process are holes. For example, during the mechanical activation process, holes can be created in the substrates or the elastic element. In some embodiments, where the elastic element comprises a plurality of elastomeric strands, for example, a defect can be considered to be a broken strand. In other embodiments, where the elastic element 118 comprises a film or a portion of a film, a defect can be a hole in the film which has a dimension in any direction which is greater than 1 mm when the stretch laminate is stretched under a force of 9.8N. While under tension, the hole is then measured to the nearest mm while under a tension of 9.8N.

The number of defects can be measured from a 5 m sample of the stretch laminate after mechanical activation. Examples of laminated structures constructed in accordance with the claimed invention are provided below. A reduction in the number of defects in the laminated structure of the claimed invention can range anywhere from about a 1% reduction to about a 100% reduction in the number of defects.

Determining the Temperature of the First Substrate Web, the Second Substrate Web, and the Elastic Element:
1. Create a transient thermal model to estimate the temperatures of the first substrate web, the elastic element, the adhesive, and, where applicable, the second substrate web. A suitable software for creating and evaluating such a model is available under the trade name FEMLAB™ manufactured by Comsol, Inc. in Stockholm, Sweden.
2. Determine various properties of the materials that will be used to make the intermediate stretch laminate.

Several properties of the nonwovens, the film, the adhesives, and the ambient air are determined. The bulk average heat capacity, bulk average thermal conductivity, the bulk average density, and the initial temperature, are determined for the subtrate(s), adhesive, elastic element, and ambient air. The bulk average basis weight and the velocity of the nonwoven(s), the elastic element, and the adhesive, are determined also. In addition, the crystallization temperature, the crystallization rate constant, and the heat of crystallization, are determined for the adhesives.

Where available, the values to be determined above can sometimes be found in tables which are available to the public. However, in the absence of tabular data, thermal conductivity is determined in accordance with ASTM D 5930; density is determined in accordance with BS EN ISO 845; heat capacity is determined in accordance with ASTM E 1269; crystallization temperature and crystallization rate constant are determined in accordance with ASTM D 3418; and heat of crystallization is determined in accordance with ASTM E 793.
3. Measure the process conditions for the formation of the intermediate laminate and for the formation of the stretch laminate.
   a. Measure the distance that the substrate(s) travel from the point of adhesive application to the point of attachment to the elastic element.
   b. In processes where nipping occurs before mechanical activation, measure the distance that the intermediate laminate (e.g. the substrate(s), adhesive, and elastic element) travels between the point of attachment and the point of engagement by the activation rolls. In processes where the mechanical activation step occurs before the nipping step, step b. can be disregarded.
   c. Input properties from steps 1-3 into the transient thermal model.
4. Run the transient thermal model.
5. Compare calculated temperatures with claimed ranges.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a stretch laminate, the method comprising the steps of:
   providing a nip including nipping member, the nipping member comprising first and second coaxial and axially spaced-apart cylindrical surfaces that form a first nip region, a second nip region and a non-nip region disposed between the first nip region and the second nip region;
   providing a first substrate web to the nipping member, the first nip region, the non-nip region and the second nip region;
   simultaneously providing an elastic film to the nipping member, the first nip region, the non-nip region and the second nip region,
   joining the first substrate web and the elastic film in a face to face relationship at the first nip region and the second nip region with adhesive therebetween, thereby creating an intermediate laminate, wherein the intermediate laminate comprises a first tack down region created by the first nip region, a second tack down region created by the second nip region, and an activation region between the first tack down region and the second tack down region, and wherein the first substrate web and the elastic film are coextensive across the first tack down region, the activation region and the second tack down region; and
   mechanically activating the activation region of the intermediate laminate, thereby creating the stretch laminate.

2. The method of claim 1, wherein the activation region is mechanically activated at a strain rate of $\geq$ about 100 s$^{-1}$.

3. The method of claim 1, wherein the activation region is mechanically activated at a strain rate of $\geq$ about 200 s$^{-1}$.

4. The method of claim 1, wherein the activation region is mechanically activated at a strain rate of $\geq$ about 500 s$^{-1}$.

5. The method of claim 1, wherein the first tack down region is disposed adjacent to a first end of the intermediate laminate, and the activation region is disposed inboard of the first tack down region.

6. The method of claim 1 further comprising the steps of:
   providing a second substrate web to the nipping member, wherein the intermediate laminate comprises the first substrate joined to the elastic film in a face to face relationship with adhesive therebetween and comprises the second substrate web joined to the elastic film in a face to face relationship with adhesive therebetween.

* * * * *

UNITED STATES PATENT AND TRADEMARK OFFICE
CERTIFICATE OF CORRECTION

| | | |
|---|---|---|
| PATENT NO. | : 7,824,514 B2 | Page 1 of 1 |
| APPLICATION NO. | : 11/291188 | |
| DATED | : November 2, 2010 | |
| INVENTOR(S) | : Venkitaraman et al. | |

It is certified that error appears in the above-identified patent and that said Letters Patent is hereby corrected as shown below:

<u>Column 1</u>
Line 25, delete "Convention" and insert --Conventional--.

<u>Column 12</u>
Line 2, delete "bases" and insert --basis--.

Signed and Sealed this
Twenty-eighth Day of June, 2011

David J. Kappos
*Director of the United States Patent and Trademark Office*